United States Patent Office 3,193,348
Patented July 6, 1965

3,193,348
METHOD OF PRODUCING BOEHMITE HAVING CRYSTAL SIZE IN EXCESS OF 100 A.
John Mooi, Homewood, Ill., assignor to Sinclair Research, Inc., Wilmington, Del., a corporation of Delaware
No Drawing. Filed Feb. 19, 1962, Ser. No. 174,304
5 Claims. (Cl. 23—143)

The present invention relates to a method for the production of a crystalline boehmite precursor for catalytically-active metal components to provide a variety of catalysts.

Alumina hydrate as it is first precipitated from aqueous solutions of aluminum salts by the addition of basic solutions is usually amorphous. When it is washed and dried, it shows no diffraction pattern with X-rays. Under some circumstances an X-ray diffraction pattern of boehmite is found with this kind of material, but the pattern is such that it indicates the crystal size of the boehmite to be less than about 50 A. and the content of boehmite usually less than 70%. This material forms an adequate catalyst support for some purposes and is used extensively.

The quality of the catalyst support can be improved a great deal if the support precursor is composed of sizes greater than 50 A. This improvement comes about through an improvement in the porosity of the tablets from these supports. In general it has been found that an increase in the boehmite crystal size results in an increase in pore radius. This increase in pore size results in greater diffusion rates for reactants and products into and out of the catalyst tablet, and often this results in improved catalyst activity. The extent to which boehmite crystal size can be increased with advantage, however, is limited. As the crystal size is increased there is a decrease in surface area. Since the catalyzed reactions take place on the surface, it is clear that surface area should not be too severely reduced. A range of boehmite crystal sizes from about 50–200 A. are of interest for catalyst supports. This gives a surface area range from about 350 to 25 m.$^2$/g. and pore radii from about 35 to 1000 A. Crystal sizes from about 90–150 A. cover the optimum, giving surface areas ranging from about 250 to 100 m.$^2$/g. and pore radii from about 100 to 150 A.

Methods for the production of crystalline boehmite in the proper size range have heretofore been unsatisfactory for one reason or another. For example, alumina hydrate precipitated from aluminum chloride solutions by the addition of ammonia solutions or through the decomposition of urea can be transformed into crystalline boehmite in the proper size range if it is refluxed in mother liquor. The reflux periods usually required to effect the proper extent of conversion in these methods, however, are of considerable length, generally between 3 and 5 days. Now these reflux periods can be reduced if the slurry is held at temperatures substantially higher than its boiling point at atmospheric pressure, but this requires expensive equipment to withstand the pressures which develop. A reduction in the concentrations of the aluminum chloride and the basic solutions also results in an increase in the rate of boehmite growth and a reduction in the required reflux period. Dilute solutions, however, also result in increased expense due to the fact that larger equipment is required.

A method has now been discovered whereby crystalline boehmite having a crystal size in excess of about 100 A. can be produced at an improved rate without the aforementioned objections from alumina hydrate precipitated from aluminum chloride with ammonia solutions. In accordance with the present invention ammonium carbonate in an aqueous solution, usually with ammonia, is added slowly at atmospheric pressure to an aluminum chloride solution maintained at a temperature of about 150 to 215° F., preferably about 175 to 215° F. (i.e., near the boiling point of the aqueous aluminum chloride solution), until an excess, for instance about 10 to 30%, preferably about 20%, over that required to precipitate all the aluminum as Al(OH)$_3$ has been added and refluxing the resultant mixture. A crystalline boehmite having a crystal size in excess of about 100 A. units, more often of about 110–150 A., and other properties desirable in a catalyst support can be obtained by this method in less than 24 hours even when 1 molar aluminum chloride is used.

The aqueous aluminum chloride solution of the present invention contains generally about 0.2 to 6 molar, preferably about 0.5 to 2 molar, concentration of aluminum chloride. The concentration of ammonia-ammonium carbonate solution employed is generally from about 0.2 to 15 normal, preferably about 1.8 to 8 normal. The molar ratio of ammonia to ammonium carbonate is usually about 0 to 50:1, preferably about 0.5:1 to 20:1.

It is important, as aforementioned, that the ammonia-ammonium carbonate solution be added to the ammonium chloride solution as opposed to, for instance, simultaneous addition or incremental mixing of the reactants. The addition rate is relatively slow and the time may constitute say about 90 to 360 minutes, preferably about 180 minutes. Advantageously the aluminum chloride and the resultant alumina hydrate slurry are stirred rapidly during the addition.

Reflux time after the addition will depend on the percentage of boehmite it is desired to have in the product. Although substantial percentages of the desired boehmite crystals in the product can be obtained with a reflux time of less than about 24 or 48 hours, usually about 15 to 48 hours are employed. Depending on the concentrations of the solutions and the percentages of boehmite sought, the reflux time could range from less than about 1 hour to 200 or more hours.

As an incident to the alumina hydrate formation, extraneous contaminating ions such as chloride ions may be introduced. These ions can be materially removed by washing the alumina hydrate with water, for instance, to reduce the chloride ion concentration in the precipitated portion to less than about 0.2% on a dry basis. Dilute ammonium carbonate solution can be used advantageously during washing to lower the chloride content since it provides for a significantly faster rate of chloride removal than when only water is used for washing.

The hydrous alumina produced by this invention is particularly effective for use as a catalyst component or catalyst support in any suitable reaction system and can be advantageously employed in hydrocarbon conversion reactions carried out at elevated temperatures in the presence of hydrogen such as, for instance, reforming, hydrocracking, hydrodesulfurization, isomerization, hydrogenation, dehydrogenation and the like. Thus, the hydrous alumina may be impregnated or otherwise composited with catalytically active materials such as metals or metal compounds particularly those from Group VIA and Group VIII of the Periodic Table.

These catalytic materials include, by way of example, compounds of chromium, molybdenum, tungsten, iron, nickel, cobalt, the platinum group metals, such as platinum, palladium, ruthenium, rhodium and iridium, or mixtures of two or more such compounds.

The amount of metal or metal oxide composited with the alumina will depend on a particular metal involved as well as on the intended use of the resulting composite. With metals of the platinum group, the amount of metal composited with the alumina will generally be within the approximate range of 0.01 to 2% by weight of the final composite. With metals of the iron group, usually larger amounts will be employed generally between about 0.1% to about 20% by weight of the final composite. With two or more metal or metal oxides, the total metal composited with the alumina will generally be within the approximate range of 1% to 30% by weight of the final composite. Thus, with a composite of alumina, molybdenum oxide and cobalt oxide, the final composition will generally contain from about 5% to about 15% by weight of molybdenum oxide and from about 0.5% to about 5% by weight of cobalt oxide and the remainder alumina.

Thus, platinum is an effective metal component to be combined with the alumina since composites of platinum and the alumina produced according to the invention have been found to be very active, particularly when the composite so prepared is to be employed in the reforming of petroleum naphtha fractions.

When making a catalyst the hydrous alumina can be impregnated using conventional procedures including direct impregnation with a suitable catalytic promoting solution without undergoing previous extensive filtering, washing, drying and calcining operations. The hydrous alumina is normally filtered and washed for purification, one or more catalytic promoting constituents incorporated either before or after filtration or before or after drying, and subsequently calcined before or after formation of macrosized particles by tabletting or extrusion. The macrosized particles can be formed before or after drying or calcination of the boehmite. The impregnation may also take place before or after calcining the alumina to the activated or gamma-alumina form.

In the preferred embodiment the aqueous slurry of washed hydrous alumina produced may be impregnated directly with the catalytic promoting material, particularly when the solids are diluted sufficiently to allow good stirring. With platinum, a preferred method of introduction is to contact the slurry of washed hydrous alumina produced with a solution of chloroplatinic acid while stirring, and to thereafter add an aqueous solution of hydrogen sulfide or otherwise introduce a suitable reagent to yield sulfide ion through the slurry with continued stirring, forming platinum sulfide. Another suitable method for introducing platinum into the hydrous alumina slurry is to form a separate aqueous solution of chloroplatinic acid and to introduce hydrogen sulfide gas into the solution until a finely subdivided precipitate has formed. Thus, chloroplatinic acid solution is normally light yellow and upon addition of hydrogen sulfide gas turns to a dark brown color. The brown suspension may then be combined with the slurry of hydrous alumina. While platinum is preferably combined with the alumina as a solution of chlorplatinic acid, other suitable platinum solutions may be employed including solutions or suspensions. In certain instances it may be desirable to use other than water only as a medium for adding the component to the alumina. In addition to platinum, other metals of the platinum family such as palladium may be combined with the alumina in a similar manner using, for example, palladium chloride as the impregnating solution.

The hydrous alumina produced in accordance with this invention is also effective as a support, carrier, or component for catalytic bodies including nickel and tungsten sulfides, as well as for carrying chromium or molybdenum. These latter metals may be deposited on the hydrous alumina before or after drying by contact thereof with suitable solutions of chromium or molybdenum-containing compounds. In similar fashion, the hydrous alumina produced in accordance with the present process may be impregnated with nickel, iron, molybdenum, tungsten, cobalt or oxides of these metals. A particularly effective catalytic composite comprises alumina, molybdenum oxide and cobalt oxide. Another effective catalytic composite comprises alumina, molybdenum oxide and oxides of nickel and iron. See U.S. Patent No. 2,781,295.

In preparing such composites, any suitable soluble salt of the metal of the iron group may be employed. For cobalt, a particularly preferred salt is cobalt sulfate, although other soluble salts may be employed including cobalt nitrate and cobalt choride. Soluble salts of nickel, suitable for use as impregnating solutions include tetramine nickel (II) nitrate, nickelous nitrate, nickelous sulfate, nickel bromide, nickel fluosilicate, nickel chloride, and nickel iodide. Soluble iron salts include ferric nitrate, ferric chloride and ferrous sulfate. When compositing two or more metal compounds with the alumina, an impregnating solution comprising the two or more metal compounds may be employed as an impregnating solution or alternatively, the alumina may be initially composited with an impregnating solution of one metal compound, thereafter dried and/or calcined and then composited with a solution of the second metal compound. After impregnation, the resulting impregnated product is dried generally at a temperature within the range of about 170° F. to 400° F. for at least about six hours and up to about twenty-four hours or more with a stream of air circulated to carry off the water vapor. The alumina catalyst mixture then may be formed into macrosize particles by a tabletting or extruding operation. The macrosized particles can be formed, however, before or after drying, calcination or impregnation. If the catalyst is to be in finely divided form, a grinding operation may follow drying, or calcination. In the case of tabletting it is customary to incorporate a die lubricant which advantageously is organic and can be burned out by oxidation in the calcination step.

The pellets or finely divided particles are suitable for subjection to high temperature treatment or calcination at a temperature between about 500° F. and about 1400° F., usually about 700° F. and 1200° F., for a period at least sufficient to provide activated or gamma-alumina. Often calcination may take between about two and about thirty-six hours. It is sometimes preferred that the calcining operation be conducted to minimize contact time of the alumina containing product with water vapor at the high temperatures encountered. The product after drying generally contains a substantial amount of water, for example, from about 15 to 30% of water including that chemically combined, which is driven off at temperatures above 500° F. It is usually preferred to heat the alumina-containing composite at a rate of about 2 to 20° F. per minute up to about 600° F. with an air flow through the catalyst bed followed by heating at a slower rate to the final calcination temperature within the range of about 500° F. to 1400° F. especially if an organic die lubricant is to be oxidized without localized overheating. While the calcination or heat treatment will generally be conducted in air, it is also feasible to carry out the same in other oxidizing atmospheres, a reducing atmosphere such as for example, hydrogen or methane, or an inert atmosphere, such as nitrogen. In some instances it may be desirable to carry out the calcination initially in a blend of air and nitrogen followed by heat treatment in an atmosphere of air or hydrogen. The alumina impregnated with one or more catalytically active materials is cooled to yield the finished product.

In general, the boehmite supports of the present invention containing catalytic amounts of a platinum group noble metal, e.g. platinum, can be used to reform under the usual conditions of reforming for instance, to reform light hydrocarbon stocks to produce gasoline, benzene and other selected aromatics. The hydrocarbon stock to be reformed is contacted with the catalyst in a reaction zone at an elevated temperature generally within the range of about 750° to about 1000° F. under a total pressure generally of about 200 to about 1000 p.s.i.g. and a hydrogen partial pressure approximating from about 3 to about 20 moles of hydrogen per mole of hydrocarbon charge stock.

The catalyst is conveniently handled in the form of pellets or tablets which are placed in the reaction zone in the form of a fixed bed, although, in finely divided form, the catalyst may be handled in a fluidized reaction system. The charge stock is preheated to processing temperature in a conventional refinery heater and is combined with the preheated hydrogen gas stream for passage through the reaction zone. Because of the endothermic nature of the reforming reactions, it is usually advantageous to divide the reaction zone into stages and to provide for reheating between stages. The reactor effluent is passed through a liquid-gas separating system from which the fixed gases which usually approximate upwards of about 70% hydrogen are recovered for recycle. The liquid products then are fractionated in the usual way for recovery of a stabilized gasoline reformate or for recovery of the selected aromatic hydrocarbons.

In general, the boehmite supports of the present invention containing catalytic amounts of cobalt and molybdenum can be used for desulfurization of hydrocarbon oil stocks by bringing the oil in contact with the catalyst at a temperature generally of about 580 to 780° F. depending upon the stock and degree of desulfurization desired, at pressures generally from about 200 to 800 pounds per square inch, at hydrogen recycle ranges generally from 500 to 5000 standard cubic feet per barrel of feed and at space velocities (WHSV) generally varying from about 1 to 8 depending upon the stock being processed.

The boehmite supports of the present invention containing catalytic amounts of chromia can be used for dehydrogenation of hydrocarbons by bringing the feedstock in contact with the catalyst at a temperature generally of about 800 to 1200° F. depending upon the stock and degree of dehydrogenation desired, at 0.1 to 100 p.s.i.g., and at space velocities (WHSV) varying from about 0.1 to 20 depending upon the stock being processed.

The following examples will serve to illustrate the present invention.

EXAMPLE I

An aqueous solution of ammonia and ammonium carbonate in a ratio of 3 equivalents of ammonia to 1 equivalent of ammonium carbonate was slowly added with rapid stirring to a boiling aqueous solution of $AlCl_3$ containing a 1 molar concentration of $AlCl_3$. Equal volumes of the aluminum chloride solution and ammonia-ammonium carbonate solutions were employed, the ammonia-ammonium carbonate solution containing a 20% excess over that required to precipitate all the aluminum as $Al(OH)_3$. The addition time was 180 minutes. The resultant slurry was refluxed and samples were withdrawn periodically, filtered and washed with ammonium carbonate solution.

Each sample was impregnated in an identical manner with platinum, oven-dried and tabletted with 2 weight percent Sterotex. The tabletted platinum-alumina catalysts were then submitted for analysis. The results are shown in Table I below.

*Table I*

| Sample No. 410 | 1,244 | 1,245 | 1,246 | 1,247 | 1,248 |
|---|---|---|---|---|---|
| Reflex Time, Hours | 0 | 18 | 42 | 66 | 138 |
| Percent V.M. (1,000° C.) | 34.8 | 26.6 | 25.2 | 24.9 | 24.8 |
| Percent Pt (ignited basis) | 0.379 | 0.366 | 0.369 | 0.374 | 0.367 |
| Percent Cl | 0.29 | 0.34 | 0.36 | 0.35 | 0.39 |
| Percent Boehmite, X.R.D. | 0 | 71 | 93 | 94 | 93 |
| Boehmite Size, A | -------- | 124 | 122 | 124 | 122 |

The data of Table I demonstrate that the method of the present invention is capable of producing substantial percentages of boehmite having a crystal size of 124 A. units in a refluxing time of less than 18 hours even when the molar concentration of aluminum chloride is as high as 1 mole per liter. The maximum crystal size was obtained in less than 18 hours and approximately the maximum percentage in less than 42 hours reflux time.

EXAMPLE II

The alumina hydrate precipitation procedure of Example I was employed using ammonia alone instead of ammonia-ammonium carbonate solution. The resulting slurry was refluxed 120 hours and the product was filtered, washed and oven-dried. Analytical data for the oven-dried sample are given in Table II.

*Table II*

| | |
|---|---|
| Based used | $NH_3$ |
| $AlCl_3$ concentration | 1.0 |
| pH of slurry (before aging) | 8.3 |
| After aging: spl. No. 410 | 1172 |
| Percent V.M. (1000° C.) | 24.6 |
| Percent Cl | 0.16 |
| Percent boehmite, X.R.D. | 72 |
| Boehmite size A | 112 |
| Surface area, m.²/g. | 171 |

Comparison of the data of Table II with that of Table I shows that when a 1 molar aluminum chloride solution was used, the same percentage of boehmite had grown in 18 hours from alumina hydrate precipitated with a combination of ammonia and ammonium carbonate as was grown in 120 hours from alumina hydrate precipitated with ammonia alone.

EXAMPLE III

This example is included to illustrate the importance of the method of addition of the reagents as defined by the present invention.

A 2 molar $AlCl_3$ solution and 2.3 N ammonia-ammonium carbonate solution (in ratio of 2 equivalents of ammonia to 1 equivalent of ammonium carbonate) were added simultaneously from burets into 750 ml. of boiling deionized water stirred rapidly in a 2 liter fluted flask.

Two runs were made, one where the pH of the slurry (before aging) was maintained at about 6.35 and the other where the pH of the slurry was raised to about 8.9. The addition time for runs was between 60–70 minutes. After the addition was complete, a portion of the slurry was removed, filtered and washed with ammonium carbonate solution. The remainder was refluxed for 120 hours after it also was filtered and washed with ammonium carbonate solution. Portions of both filter cakes were examined with an electron microscope. The remainder was oven-dried and used for all other analyses. The results are shown in Table III below.

*Table III*

| | | |
|---|---|---|
| pH of Precipitation | 6 | 6 |
| pH of Slurry (Before Aging) | 6.35 | 8.9 |
| Before Aging: Spl. No. 410— | 1,029 | 1,046 |
| Percent V.M. (1,000° C.) | 25.9 | 20.89 |
| Percent Cl | <0.05 | 0.05 |
| Percent Boehmite X.R.D | 66 | 62 |
| Boehmite Size, A | 43 | 45 |
| After Aging: Spl. No. 410— | 1,034 | 1,049 |
| Percent V.M. (1,000° C.) | 20.8 | 20.37 |
| Percent Cl | 0.06 | <0.05 |
| Percent Boehmite X.R.D | 77 | 72 |
| Boehmite Size, A | 50 | 55 |

The data show that although a rather good percentage of boehmite is produced by the simultaneous addition of ammonia-ammonium carbonate solution and aluminum chloride solution to boiling water and refluxing for 120 hours, the crystal size of the boehmite produced was small, i.e., 50 and 55 A. units.

I claim:

1. A method of producing crystalline boehmite having a crystal size in excess of about 100 A. which comprises adding to an aqueous aluminum chloride solution maintained at a temperature of about 150 to 215° F., an aqueous solution of ammonium carbonate until an excess of said ammonium carbonate solution over that required to precipitate all of the aluminum as $Al(OH)_3$ has been added and refluxing the resultant mixture to obtain crystalline boehmite having a crystal size in excess of about 100 A.

2. The method of claim 1 wherein an excess of about 10 to 30% of ammonium carbonate is employed.

3. The method of claim 2 wherein the aluminum chloride solution contains about 0.5 to 2 molar concentration of aluminum chloride, the ammonium carbonate solution contains ammonia in a molar ratio of ammonia to ammonium carbonate of about 0.5:1 to 20:1, and the concentration of the ammonia-ammonium carbonate solution is about 1.8 to 8 normal.

4. The method of claim 3 wherein the temperature at which the aqueous aluminum chloride solution is maintained during said addition at about 175 to 215° F. and the addition time is about 90 to 360 minutes.

5. The method of claim 2 wherein the refluxing time is about 15 to 48 hours.

References Cited by the Examiner
UNITED STATES PATENTS

| | | | |
|---|---|---|---|
| 1,337,192 | 4/20 | Buchner | 23—143 |
| 2,838,444 | 6/58 | Teter et al. | 23—143 X |
| 2,874,130 | 2/59 | Keith | 23—143 X |
| 2,894,915 | 7/59 | Keith | 23—143 X |

MAURICE A. BRINDISI, *Primary Examiner.*